UNITED STATES PATENT OFFICE.

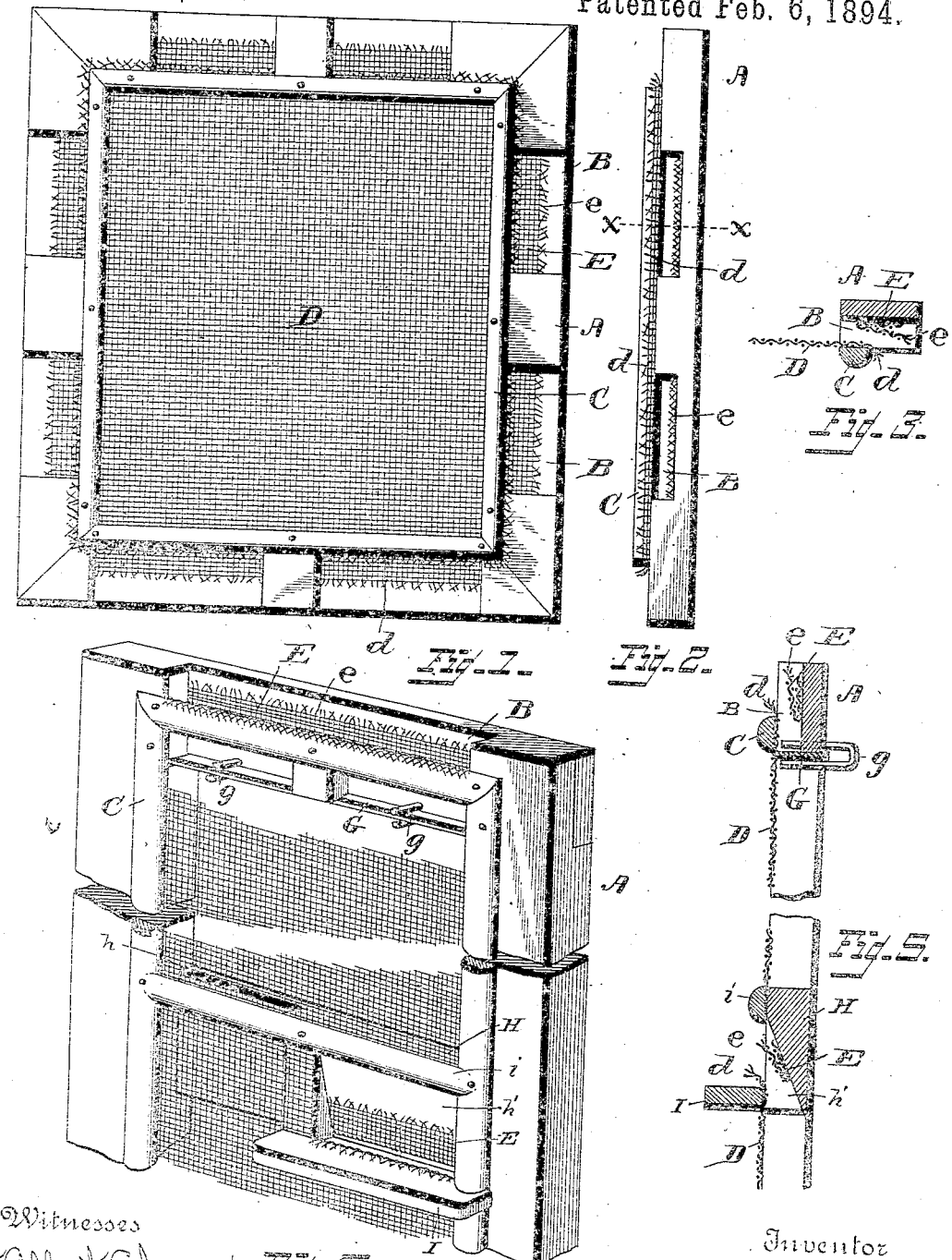

MARY JOSEPHINE TENNEY, OF OSKALOOSA, IOWA.

FLY-SCREEN.

SPECIFICATION forming part of Letters Patent No. 514,890, dated February 6, 1894.

Application filed May 14, 1892. Serial No. 433,028. (No model.)

*To all whom it may concern:*

Be it known that I, MARY JOSEPHINE TENNEY, a citizen of the United States, residing at Oskaloosa, in the county of Mahaska, State of Iowa, have invented certain new and useful Improvements in Fly-Screens; and I do hereby declare the following to be a full, clear, and exact description of the invention, such as will enable others skilled in the art to which it appertains to make and use the same.

This invention relates to screens for windows and doors, and is designed to exclude insects from an apartment and admit and facilitate the escape of any insects which may be confined in the said apartment, and at the same time secure a perfect ventilation.

The improvement consists in the novel features and the peculiar construction and combination of the parts which will be hereinafter more fully described and claimed and which are shown in the annexed drawings, in which—

Figure 1 is an elevation of the screen embodying my invention. Fig. 2 is an edge view of the said screen. Fig. 3 is a cross section about on the line X X of Fig. 2. Fig. 4 is a view showing the application of the invention to a screen door. Fig. 5 is a cross section showing a cut off for closing the fly escape passage.

The frame A may be of any approved form of construction and the bars composing the same are cut away on one side at required intervals to form the fly escape passages B. The end and intermediate portions of the said bars remaining intact, are designed to form supports for the strips C which are nailed thereto and between which portions and the said strips the wire cloth D is clamped. The edges of the wire cloth are projected beyond the outer edges of the strips C and are curved away from the bars of the frame and are frayed to form a series of barbs or points $d$ which are designed to prevent the ingress of insects through the passages B. To further impede the ingress of insects a strip of wire cloth E is folded between its edges and secured to the bars of the frame opposite the portion $d$ of the wire cloth D. The outer edge of the strip E is curved to correspond with the projecting portion of the wire cloth D and is frayed to form corresponding barbs or points $e$ for a purpose similar to the barbs $d$. It will be seen that the strips C are comparatively narrow when compared with the bars of the frame and are placed at the inner edge of the said bars, thereby bringing the barbs $d$ and $e$ wholly within the confines of the frame A so that the said barbs will not interfere with the free handling of the said screen. By having the escape passages provided on all sides of the frame insects may escape in any direction, and by having the escape passage in the plane of the wire cloth no impediment is offered to the free escape of the said insects.

In applying the invention to screen doors it is preferred to provide the escape passages at the top of the door frame, only. The middle cross rail H is constructed for one portion or the whole of its length to leave a space $h$ between it and the wire cloth so that insects may have a free passage from the lower portion of the screen to the upper part thereof and find their way out through the upper passages at the top of the frame. The other portion of its length is constructed substantially as shown in Fig. 4, having an escape opening $h'$ which will admit of the direct escape of the insects, and which is guarded by barbs or points to prevent the return of the said insects. The escape opening $h'$ is formed by cutting away a portion of the cross rail H slanting as most clearly shown in Fig. 5. Opposite the lower portion of the cross rail H a short bar I is arranged and secured at its ends respectively to the middle portion of the cross rail H and the side piece of the frame. The screen cloth opposite the escape $h'$ is secured to this short bar I. The escape $h'$ opens on the side of the screen opposite to that to which the cross rail is applied. A strip $i$ secures the wire cloth to the top edge of the cross rail above the escape $h'$.

A cut off G is provided to close the escape passage and consists of a strip which is adapted to slide in grooves provided in the frame, and which is supported between its ends at proper points by staples or other means $g$ which have one leg driven into the frame and the other adapted to embrace the said strip between it and the edge of the said frame.

Having thus described my invention, what I claim, and desire to secure by Letters Patent, is—

A screen frame having a cross rail, and having one side of the top rail cut away to form an escape passage, narrow strips applied to the frame bars near the inner edge thereof, the wire cloth held to the frame by the said narrow strips and having its top edge projected beyond the top strip and constructed to form a series of barbs, along the outer side of the said escape passage, a strip of wire cloth folded between its edges and secured to the said recessed top rail, and having its outer edge constructed to form a series of barbs, the said cross rail having a portion of its whole length cut away on the side opposite the wire cloth to form a passage between the upper and the lower portions of the screen, and having its other portion cut slanting to form an escape opening, and having the wire cloth secured thereto, substantially as shown and for the purpose set forth.

In testimony whereof I affix my signature in presence of two witnesses.

MARY JOSEPHINE TENNEY.

Witnesses:
 JOHN F. LACEY,
 W. H. SEWN.